Feb. 26, 1929.

W. L. MYERS

LEVEL

Filed Aug. 10, 1925

Inventor.
WILLIAM L. MYERS
Cornwall, Biddle & Janney
Attorneys.

Feb. 26, 1929.
W. L. MYERS
LEVEL
Filed Aug. 10, 1925
1,703,589
2 Sheets-Sheet 2
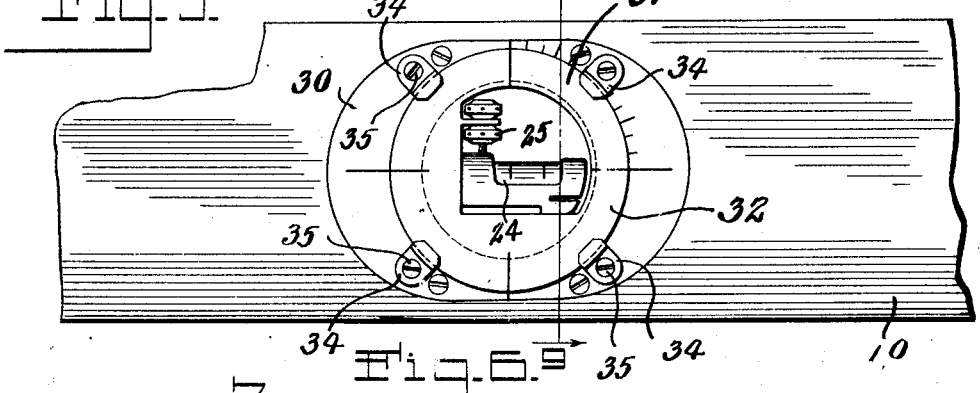
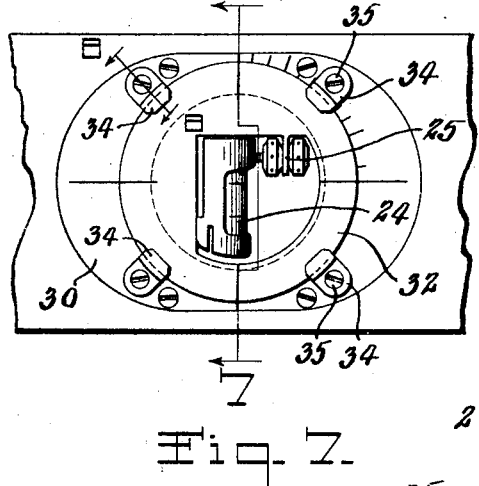
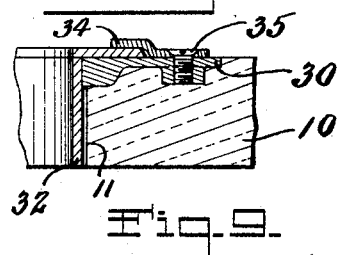
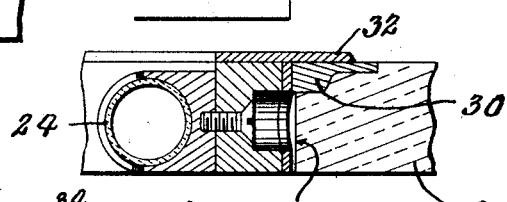
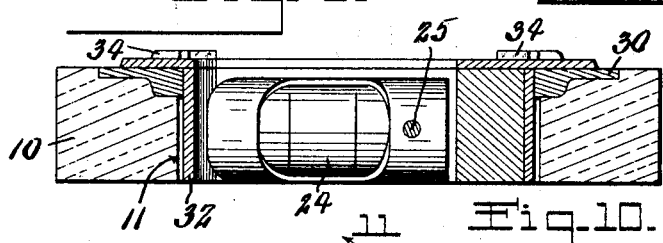
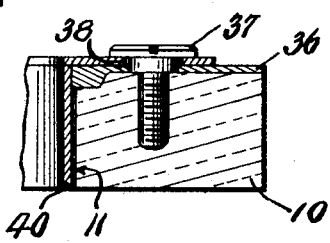
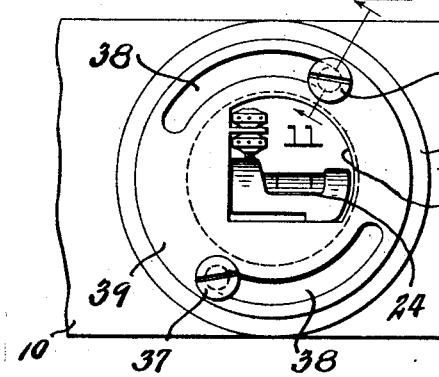
Inventor.
WILLIAM L. MYERS Patented Feb. 26, 1929.

1,703,589

UNITED STATES PATENT OFFICE.

WILLIAM L. MYERS, OF ST. LOUIS COUNTY, MISSOURI.

LEVEL.

Application filed August 10, 1925. Serial No. 49,427.

This invention relates to new and useful improvements in level instruments and has for its object the provision of a level instrument which is adjustable so that it can be used either as a level for measuring horizontal surfaces or as a plumb for measuring vertical surfaces and which is further adjustable to measure planes of any degree.

Further objects of the invention are to provide a level instrument having the leveling device adjustable, and means for securing said leveling device in adjusted position to prevent accidental displacement thereof.

Still further objects of the invention are to provide a combination level and plumb which is simple in construction and operation, can be easily adjusted, and can be economically manufactured.

With these and other objects in view, my invention consists in certain novel features of construction and arrangement of parts, hereinafter more fully described and claimed, and illustrated in the accompanying drawings, in which—

Figure 5 is a side view of a modified form of level instrument, showing the leveling device in one position.

Figure 6 is a similar view showing the leveling device adjusted at right angles to the position shown in Figure 5.

Figure 7 is a vertical cross section taken on line 7—7 of Figure 6.

Figure 8 is a detail cross sectional view taken on line 8—8 of Figure 6.

Figure 9 is a sectional view taken on line 9—9 of Figure 5.

Figure 10 is another modified form of leveling device.

Figure 11 is a sectional view taken on line 11—11 of Figure 10.

Figure 1:
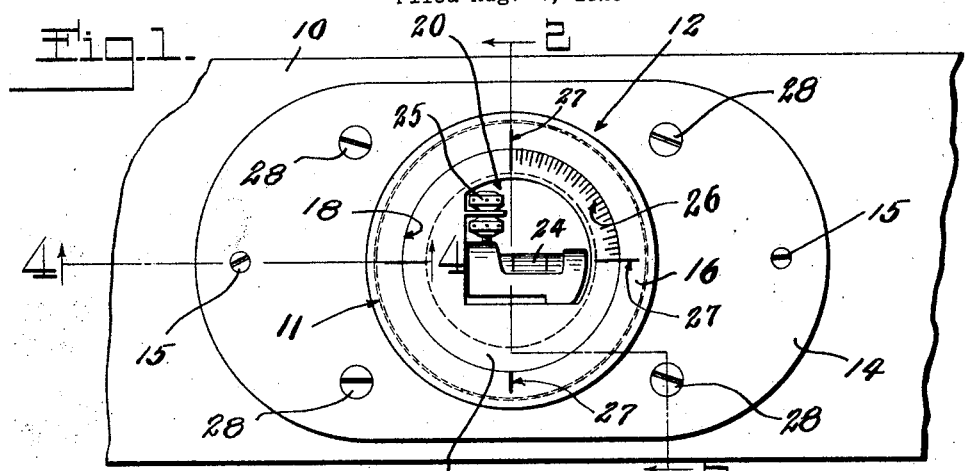
Figure 1 is a side view of the level instrument showing the same attached to a straight edge or bar.

Heretofore combined levels and plumbs were made with two leveling devices or level tubes, one of which is used to determine horizontal surfaces and the other is used to measure vertical surfaces.

It is the object of the present invention to provide a level instrument having only one leveling device which is adjustable to determine both horizontal and vertical surfaces and planes of various degrees.

Referring by numerals to the accompanying drawings, 10 indicates a bar or board having a straight edge and provided with a central opening 11 for receiving the level indicating device 12. This level indicating device consists of a plate 14 which is adapted to be attached to the board by suitable screws 15. This plate is provided with a central raised portion 16, thereby forming in the underside thereof a circular pocket 17 which is concentric with the circular opening 18 formed in the raised wall of portion 16.

Figure 2:
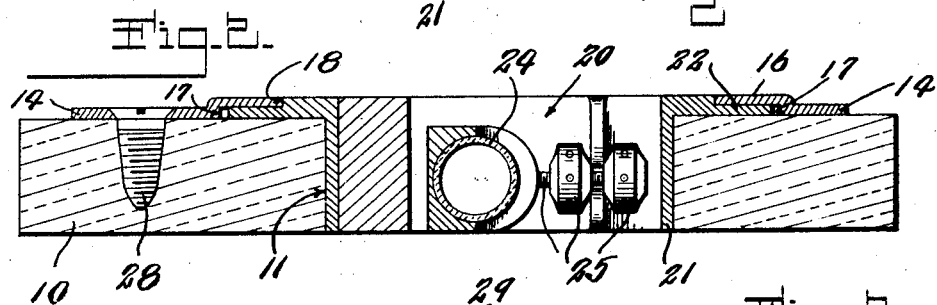
Figure 2 is a vertical cross section taken on line 2—2 of Figure 1.
Figure 3:
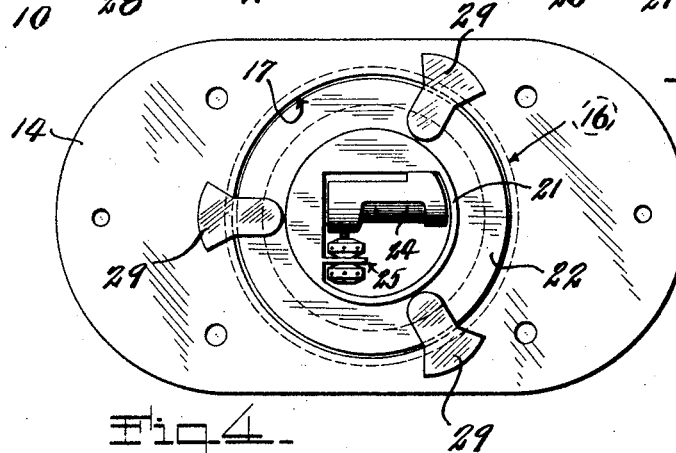
Figure 3 is a side view of the reverse side of the leveling device.
Figure 4:
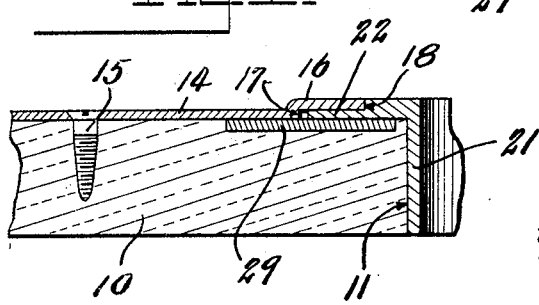
Figure 4 is a detail cross section taken on line 4—4 of Figure 1.

An adjustable member 20 containing the bubble tube 24 consists of a tubular portion 21 which is adapted to be movably disposed in the opening 11 of bar 10 and is provided at its upper end with a circular flange 22 which is received in the circular recess 17. The upper face of member 21 is slightly raised above the flanged portion 22 in order to bring said face flush with the face of raised portion 16 as shown in Figure 2. Member 20 is provided with an opening for receiving said tube 24 which is anchored to said member at one end and is engaged at the opposite end by adjusting means 25, whereby said leveling tube may be properly adjusted. The upper face of member 21 is provided with graduations 26 which are adapted to cooperate with stationary marks 27 formed on the face of raised portion 16, whereby the extent of adjustment of the rotatable member 21 can be determined by means of said graduations and marks. When member 21 carrying the leveling device or tube 24 is adjusted, screws 28 which are seated in plate 14 and threaded in the body portion of bar 10 are tightened, thereby clamping flanged portion 22 of member 21 between said bar and said plate to render said member 21 immovable, thus retaining it in adjusted position.

In order to prevent displacement of member 21 from plate 14 and maintain said parts in assembled positions when plate 14 is unattached to the straight edge, suitable fingers or projections 29 are attached to the underside of plate 14 and underlie the underside of flanged portion 22 to prevent the displacement thereof from recess 17. These extensions may be secured in any suitable manner to the plate 14.

When it is desired to adjust member 21, screws 28 are loosened so as to relieve member 21 and permit rotation thereof as desired.

In the forms shown in Figures 5 to 9, a stationary member or plate 30 is formed flat without recessed portions and the movable member 31 has an annular flange 32 bearing on top of plate 30. A series of clips 34 are attached to plate 30 by means of screws 35 and overhang the edges of flange 32, thereby preventing displacement of member 31 and serving when screws 35 are tightened to clamp said movable member and hold it in fixed position.

In the modified form shown in Figures 10 and 11, a stationary member 36 has screw-seated therein screws 37 which project upwardly through arcuate slots 38 formed in the flanged portion 39 of movable member 40. These slots permit adjustment of member 40 to the proper degree and by screwing down devices 37 member 40 is locked against movement.

In this manner only one leveling device is necessary for each straight edge and the movable member carrying the level can be adjusted so that the instrument may be used as a level or a plumb. The device itself consists principally of two members, one of which is stationary and is adapted to be fixed to the straight edge, and the other member which carries the leveling device is rotatable within said stationary member and adapted to be fixed in adjusted position by suitable locking means.

I claim:

A level instrument comprising in combination a straight edge provided with a transverse circular opening extending therethrough, a perforated stationary plate member secured to one side of said straight edge and having a circular central flange spaced outwardly from the face of said straight edge to form a circular recess, said circular flange forming a circular opening co-axially aligned with the opening in said straight edge, a rotatable member having a circular flange freely disposed in said recess and having a cylindrical portion loosely disposed in the circular opening of said straight edge, said rotatable member being rotatable on an axis common to said straight edge opening and to said cylindrical portion, an elongated leveling device carried by said cylindrical portion and disposed transversely thereto, means for fixing one end of said leveling device to said cylindrical portion, means engaging the opposite end of said leveling device for adjusting the latter relative to its longitudinal axis, and means for clamping the flanged portion of said movable member within said recess for rendering said movable member stationary.

In testimony whereof I hereunto affix my signature this 1st day of August, 1925.

WILLIAM L. MYERS.